June 5, 1956 J. W. CUMMINS 2,748,972
POULTRY CRATE FOR USE IN POULTRY TESTING OPERATIONS
Filed Jan. 24, 1951
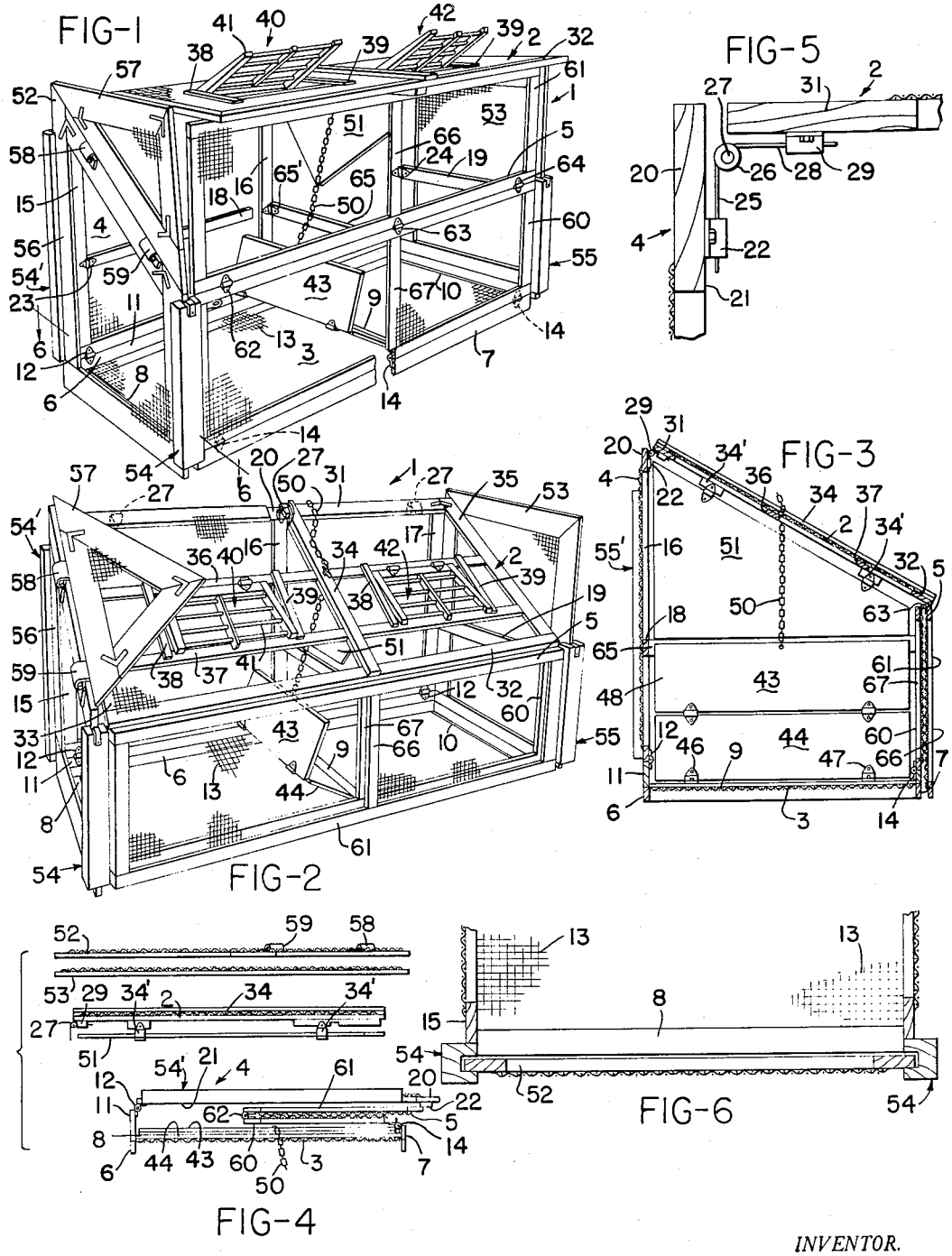
INVENTOR.
JOHN W. CUMMINS
BY Toulmin & Toulmin
ATTORNEYS United States Patent Office 2,748,972
Patented June 5, 1956

2,748,972

POULTRY CRATE FOR USE IN POULTRY TESTING OPERATIONS

John W. Cummins, London, Ohio

Application January 24, 1951, Serial No. 207,581

2 Claims. (Cl. 217—47)

This invention relates to poultry crates. More particularly the invention is concerned with a portable structure of a poultry catching and holding crate which is particularly useful in the operations of blood testing and vaccinating poultry.

The laws of most States require, for example, that chickens whose eggs are to be used for hatching purposes must be blood tested at regular intervals by personnel licensed by the State. This work is burdensome as it must be performed by the inspector at the individual farms and necessarily in the vicinity of the chicken coops.

Presently it is the practice when blood tests are to be run to set up at the door of the chicken house a substantially rectangularly shaped crate closed at one end and comprising walls of wire net supported by wooden braces and to shoo the chickens from the hen house or coop into the said crate. Since such hen houses frequently have only one door the operator must climb over the crate to the outside of the hen house, and chickens for testing purposes are selected individually from the crate through openings in the top thereof.

A number of difficulties arise in connection with the above procedure. First of all, since the tester or operator must select chickens from the crate, the crate must be of relatively low height to permit the operator to reach therein and select a chicken for test. Chickens, however, will hesitate to enter a low crate, for they become readily frightened in close quarters, and chickens who have once experienced the blood testing operation particularly resist entry to low crates.

It should be noted in this connection that the egg production of chickens is materially decreased by fright, and egg production has been noted to fall off materially after blood testing of a flock. This falling off in production is not attributable to the testing operation itself, which is relatively harmless, but to the confinement of the chickens in close quarters and the excitement engendered thereby. Further the excitement of the chickens increases their tendency to resist capture for blood testing, and consequently in such instances coops have been made very low to facilitate selection for the test.

It is a primary object of this invention to provide a poultry catching and holding structure which overcomes the above noted defects.

It is a particular object of this invention to provide a chicken catching and holding structure which is sufficiently large so that chickens will enter therein readily from a chicken house, but the interior of which structure is readily accessible from without.

It is an important object of this invention to provide a chicken catching and holding structure for the testing of chickens which may be readily handled by the operator or tester.

It is a further object of this invention to provide a chicken catching and holding structure having a unique partition arrangement whereby the crate may be readily subdivided into compartments to further facilitate chicken selection for testing purposes without danger of injury to the chicken.

It is an important object of this invention to provide a chicken catching and holding structure which facilitates the egress of an operator from the chicken house after the shooing of the chickens into the said crate.

It is also an object of this invention to provide a portable and collapsible chicken catching and holding structure embodying the hereinbefore noted features.

These and other objects of this invention are attained by providing a chicken catching and holding crate having relatively movable wall and partition portions.

Thus, in the preferred embodiment of the crate of invention a large volume coop is provided for the reception of the chickens. After the poultry have been secured therein the upper portion of one of the side walls of the crate, which is hinged at about the middle of the said wall, pivots outwardly from the body of the crate, while at the same time a top wall portion of the crate is lowered into position on the said side wall. Thus the angularly positioned top wall of the crate is rendered easily accessible to an operator, who will have no difficulty in selecting chickens from the crate through the openings in the top thereof.

It will be noted that the volume and cross sectional height of the crate is then decreased in such a manner and to such an extent as to have substantially no effect upon the chickens, but yet is a decided factor in rendering the interior portions of the crate easily accessible to the operator.

In a further embodiment of the invention partition members are provided which extend both from the top and bottom of the crate and divide the crate into compartments, thereby further facilitating selection of the chickens.

The nature and purposes of this invention have been indicated in a general way, and there follows a more detailed description of the preferred embodiment thereof with reference to the accompanying drawings in which:

Figure 1 is a view in perspective with parts broken away of the structure of the invention in its assembled position ready to receive the poultry;

Figure 2 is a view in perspective of the structure of the invention similar to that of Fig. 1 but in assembled position and also adapted for the ready selection of poultry therefrom;

Figure 3 is a transverse view of the structure of invention particularly illustrating the structure for partitioning the crate;

Figure 4 is an exploded view of the crate components in disassembled position ready to be transported or assembled;

Figure 5 is a sectional fragmentary view showing a means of pivotally securing the top wall of the structure to a side wall thereof;

Fig. 6 is a sectional view taken along line 6—6 of Fig. 1.

Referring to the drawings and particularly to Figure 1 there is shown a crate structure designated generally at 1, having top and bottom walls 2 and 3, respectively, separated by vertically extending side walls 4 and 5. Side wall 4 comprises the back wall of the crate and wall 5 the front wall. The bottom wall 3 consists of horizontally longitudinally extending members 6, 7 spaced apart by cross braces 8, 9 and 10 (Figs. 1 and 2), the space between members 6, 7 being covered by wire of suitable mesh indicated by the numeral 13. The crate as shown comprises frame members covered with wire mesh and the mesh throughout is indicated by numeral 13.

The mesh of wire preferred is about 1" x 1" which allows for the keeping of the crate in a clean condition and is of such a size that the poultry will walk readily thereon without giving rise to fear and without having their feet pass thereover. The open mesh effect also facilitates circulation of air in the crate.

Extending above and along the horizontal member 6 is a longitudinally extending spacing member 11 to which side wall 4 is secured by hinges as indicated at 12. The hinges 12 (Figs. 3 and 4) are raised slightly above the level of the bottom wall 3 in order that side wall 4 may be readily folded over on the other components when the crate is knocked down for transport.

The wall 4 includes suitable upright framework 15, 16 and 17 (Figure 2), brace 18 (Fig. 1), and a top longitudinal member 20 (Figs. 3, 4 and 5). The brace 18 (Fig. 1) is hinged to the frame work 15 as shown at 23 and when the crate is in use, and with the crate loaded with chickens for testing, the brace may extend transversely of the crate for aiding support of the same, a similar brace 19 is hinged to the framework 17 at 24 and as shown in Fig. 1 brace 19 is in position transversely of the crate for support of the same. The member 20, as may be seen in Figure 4 wherein wall 4 is indicated generally, is provided on the interior side 21 thereof with suitable support means 22 for receipt of the detachable top wall 2. This attaching of the top wall may be effected in any suitable manner which will permit pivotal movement of the top wall 2 with respect to the wall 4, but it is preferred that simple hinges of the type shown in Figure 5 be employed, which will permit of ready detachment of the top wall from the remainder of the structure.

Referring to Figure 5 it will be seen that member 20 of wall 4 has a support 22 into the aperture of which a finger 25 of the hinge 26 extends. This finger is in sliding engagement with support 22 and is further secured to a member 27. A second finger 28 also similarly secured to the member 27 is attached to the top wall 2 at 29 by suitable holding means, such as wood screws, etc. Preferably three such hinges are provided along the length of the crate.

The top wall itself comprises longitudinally extending members 31, 32 spaced apart by transverse braces 33, 34 and 35. Positioned between the members 31, 32 and extending parallel therewith are spaced members 36, 37. As shown in Figure 2, members 38, 39 define with the members 36, 37 an opening indicated generally at 40. This opening 40 may be closed by a gate element 41 spring hinged to the member 36, and as will be noted from Figure 2 the interior of the crate is rendered readily accessible therethrough.

Also, as may be seen in Figure 2, a second and similar gate element indicated generally at 42 may be provided in the structure particularly when the interior of the crate is equipped with partition means.

Wall 2 is of such a width that in the position shown in Figure 1 it extends slightly beyond the vertical wall 5 for a purpose to be described more completely hereinafter.

This side wall 5 is hinged at 14 along its bottom edge to the portion 7 of the lower wall 3 in substantially the same manner as wall 4, as hereinbefore described. However, the hinges are here positioned somewhat closer to the bottom wall 3 in order that the lower portion 60 of wall 5 may be folded directly on horizontal wall 3 with upper part 61 resting on the lower portion, and wall 4 may be laid on the superposed portions of wall 5 for ready transport as shown in Fig. 4.

Upper portion 61 of wall 5 which carries vertical brace 66 is hinged at 62, 63 and 64 to fold outwardly and downwardly to lie along the lower portion 60 having vertical brace 67 as clearly shown in Figure 2.

When the upper portion 61 of wall 5 is so lowered top wall 2 is lowered into the position shown in Figure 2 with the extended edge thereof resting on the broad surface formed by the divided wall 5. While not necessary, suitable engaging and securing means may be provided between the mating edges.

Shown in Figure 3 is a novel partition element illustrated generally at 43 and having a lower portion 44 hinged at its lower edge to transverse member 9 as at 46, 47. An upper plate 48 of the partition element is hinged at its lower edge to the upper edge of portion 44. The upper edge of portion 48 is provided with an eye or suitable means through which a control chain 50 passes. The upper end of the chain 50 passes through the top 2 and may be secured to the transverse member 34 or other appropriate portion of the top 2 to support the element 43 in raised position and to hold the chain itself when the partition is not in use.

The top wall 2 as shown in Figure 3 incorporates (Figure 2) cross brace 34 which is provided internally thereof with a second plate element 51 of trapezoidal shape which is hingedly secured to the cross brace 34. This element is of such a contour that when the top 2 is lowered into its Figure 2 position, the element may be lowered into its Figure 3 position to meet with the element 43, thereby dividing the structure into two compartments. Thus the element 51 has, as shown, one edge thereof parallel with top wall 34 while the opposing edge defines substantially right angles with the parallel sides, the longer parallel side being adjacent the side wall to which the top wall 34 is hinged. Similarly to the element 43 element 51 may be controlled by a chain or other appropriate means as desired.

The structure 1 is closed at the ends by members 52, 53 which respectively slide readily into the ways secured to the extremities of the side walls 3, 4 and indicated generally at 54, 54' and at 55, 55'. The slidable member 53 is placed in position upon assembly of the structure and serves as the end wall for retaining the poultry when they are shooed into the crate. Member 52 (Fig. 6) which is placed adjacent a chicken house, for example, from which the chickens or other poultry are driven is slidably positioned after the structure is loaded. The members 52 and 53 are each covered with wire mesh as indicated in Figs. 1 and 2.

The member 52 is preferably made in two sections, a lower portion 56 and an upper portion 57, of a substantially triangular contour secured to the lower portion 56 by double acting hinges 58, 59. Thus portion 57 may be pivoted through a very large angle either towards or away from the body of the structure, as may be clearly seen in Figure 2. Such an arrangement facilitates exit of the operator from the poultry house in instances when exit would normally be blocked by the use of a high crate.

In Figure 4 the crate is shown disassembled ready for transport or assembly. It will be noted that so knocked down the crate has four separate units, that is, two gates 52, 53; a top 2; and a main structure. This main structure comprises a screen floor 3 upon which the side wall 5 (consisting of wall portions 60, 61), folded at its center position, rests, and side wall 4 is folded over on this side wall 5.

It will be noted (Fig. 4) that the plate portion 44 is collapsed onto the bottom wall 3 and the upper plate 51 folds on the inner side of the wall 2 while supported from the cross brace 34. Thus the components make a neat package for transport and assembly may be made readily without resort to any construction work other than the simple placing of the component parts together.

It should further be noted that the structure may be supported as desired by the hinged braces which braces may be readily folded along the wall where it is hinged when the structure is in knocked down condition. When the structure is in use brace 19 may be moved into its illustrated position (Figure 1) transversely of the crate as required for support. The center brace shown at 65 (Figure 1) also aids support of the assembled structure.

The brace 65 (Fig. 1) is suitably hinged at 65' to lie along the wall 4 in the disassembled condition of the crate.

The structure described is preferably made from a wooden skeleton suitably provided with enclosing wire mesh. However, it is considered to be clear that the invention is not limited to the use of specific materials, but that the skeleton frame may be of a metal or a plastic having the desired physical properties to resist the forces exerted by the poultry load, and the general wear and tear in transport and assembly.

In the embodiment shown the structure of Figure 1 has a preferred length of about 6 feet, with a width of 3 feet, and a height of 3 feet. Since the wall 5 as shown in Figure 2 is hinged about centrally of its height, the portion 60 of wall 5 has a height of about 1½ feet, thus rendering the opening in the top wall 2 readily accessible to the inspector or operator when the top wall is lowered.

Such a crate as described will readily hold 45 to 50 chickens without crowding. However, it will be clear to those skilled in the art, that the size may be suitably selected for a particular poultry testing arrangement.

In order to use my novel structure for the purposes hereinbefore described, the crate is assembled, as in Figure 1, at the door of a poultry house with the remote end thereof closed, and the poultry are readily shooed into the crate, due to the fact that the unit has a relatively large cross sectional area throughout. After loading the second closure member that is end member 52 is lowered slidably into position in the ways and the operator may then reach out from the poultry house and lower the upper portion 61 of wall 5 and bring the top wall 2 down on the folded wall 5. The upper portion of the closure member or gate may then be moved on its hinges to allow the operator to climb easily out of the poultry house.

The outer contour of the crate has now been radically changed, yet allows the poultry plenty of room for ambulation and breathing, and the height of the box with relation to the inspector or tester is such that he may readily reach therein for selection of a poultry specimen to be tested.

When desired the partition element 43 may be readily positioned to segregate the poultry into two compartments. More compartments may, of course, be provided as required, but with the embodiment set forth above in Figure 2, two are normally sufficient.

It is clear that the above mode of operation may be altered at will to meet the varying conditions encountered in practice.

Thus I have described a novel structure for poultry catching and holding which permits a reduction in poultry testing time of approximately one-half over structures currently known. Specifically with my arrangement, I have selected and tested, while working alone, over 400 chickens in 8 hours, which is at a rate of approximately one per minute. This saving in time is attributed primarily to the fact that the poultry will readily enter my novel structure and will be readily accessible from the outside thereof without undue strain on the operator.

The term "hinge" or "hingedly" as used in this application is intended to include any suitable bearing structure which will accomplish the desired objective noted hereinbefore, and the meaning of the term is not to be restricted to the particular hinge structure shown herein.

While a preferred specific embodiment of the invention is hereinbefore set forth, it is to be clearly understood that the invention is not to be limited to the exact construction illustrated and described, because various modifications of these details may be provided in putting the invention into practice within the purview of the appended claims.

I claim:

1. A poultry crate for holding poultry for testing, said crate comprising top, bottom, front and back side walls, and end walls, said front and back side walls consisting of frame members having a mesh covering, said back side wall being hingedly secured to said bottom wall, said top wall extending transversely of said side walls and having one longitudinal edge thereof hingedly secured to the top of said back side wall and having the opposing longitudinal edge supported freely on the top edge of said front side wall, said front side wall being divided longitudinally into an upper and lower section which sections are hinged together whereby said upper section can be swung outwardly and downwardly so as to overlie said lower front side wall section, said top wall being pivotable downwardly to position the free extending edge thereof on said lower section, said lower section of said front side wall being hingedly secured to said bottom wall, said end walls being slidably retained in channel members secured to the opposite ends of said front and back side walls, said top wall having an opening therethrough to the interior of the crate for the removal of poultry for testing, one of said ends walls being adapted for positioning against a poultry house to provide for entrance of poultry to the crate, said last-mentioned end wall comprising upper and lower portions hingedly connected together for movement of the upper portion with respect to the lower portion inwardly and outwardly with respect to the crate, said hinged upper portion of the end wall being triangular shaped to form a closure wall for the crate and being swingable about its hinges to permit a test operator to climb over the lower hinged end wall portion of the crate.

2. A poultry crate as in claim 1 and which crate is compartmented, the top wall of the crate approximately centrally thereof having a compartmenting plate member of trapezoidal shape depending therefrom hingedly secured thereto and extending tranversely of the crate, the top edge of said plate being the longer edge and parallel with the top wall of the crate, other compartmenting plate member means of rectangular shape below the member of trapezoidal shape and hinged to the bottom wall of the crate and extending transversely thereof between the crate side walls, and means for supporting said other plate member means in an upright position, said plate member and said plate member means cooperating to compartment the crate longitudinally in the upright position of the plate member means and the down position of the top wall and plate member.

References Cited in the file of this patent

UNITED STATES PATENTS

| | | |
|---|---|---|
| 163,939 | Moore | June 1, 1875 |
| 318,812 | Smith et al. | May 26, 1885 |
| 579,766 | Murray | Mar. 30, 1897 |
| 1,041,333 | Neubel | Oct. 15, 1912 |
| 1,091,391 | Romans | Mar. 24, 1914 |
| 1,135,231 | Way | Apr. 13, 1915 |
| 1,365,200 | Shaw | Jan. 11, 1921 |
| 1,934,138 | Paul et al. | Nov. 7, 1933 |